Sept. 4, 1951  E. G. GARTIN  2,566,378
PRESSURE FLUID MOTOR
Filed March 29, 1945  2 Sheets-Sheet 1

Inventor:
Elmer G. Gartin.
by
Louis A. Maxson.
Atty.

Sept. 4, 1951  E. G. GARTIN  2,566,378
PRESSURE FLUID MOTOR
Filed March 29, 1945  2 Sheets-Sheet 2
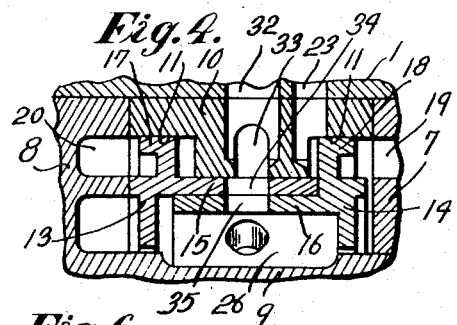
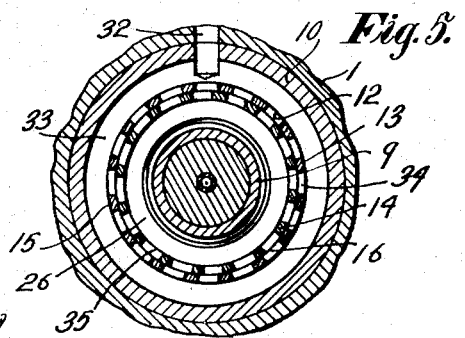
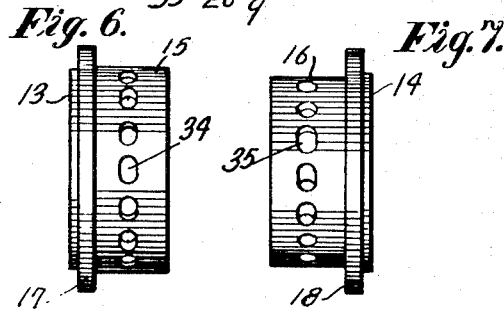
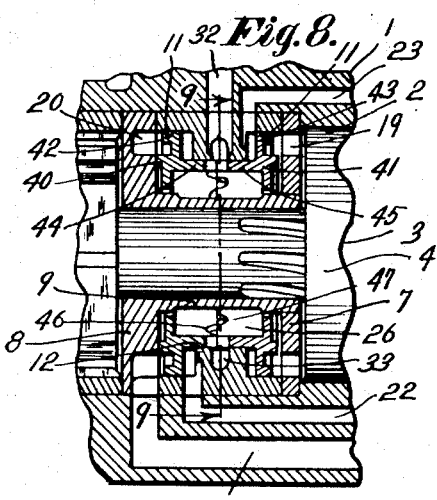
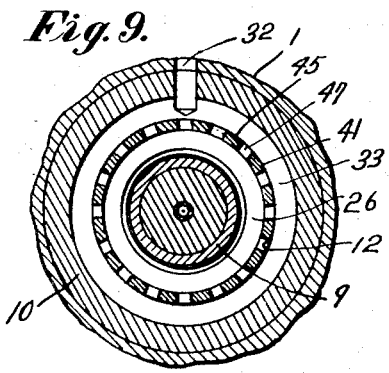
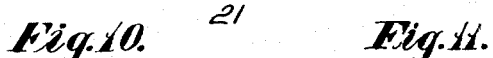
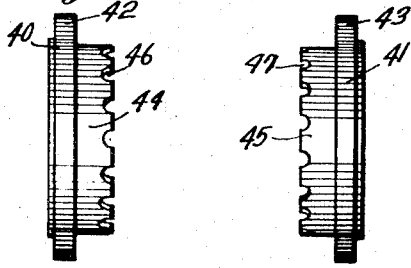
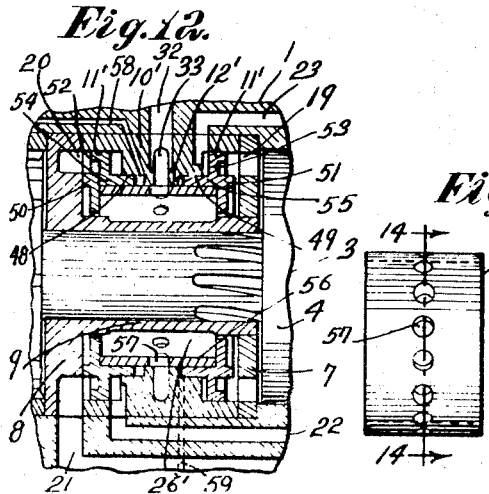
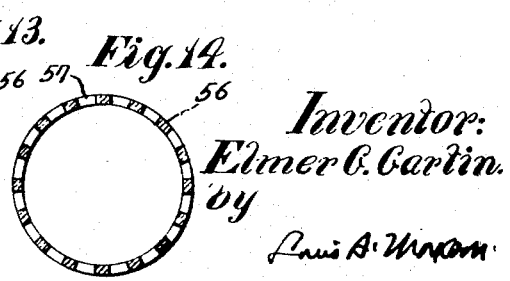
Inventor:
Elmer G. Gartin.
by
Louis A. Unkam
Att'y.

Patented Sept. 4, 1951

2,566,378

UNITED STATES PATENT OFFICE 2,566,378

PRESSURE FLUID MOTOR

Elmer G. Gartin, Claremont, N. H., assignor to Joy Manufacturing Company, a corporation of Pennsylvania Application March 29, 1945, Serial No. 585,449

10 Claims. (Cl. 121—19)

This invention relates to pressure fluid motors and more particularly to improvements in the fluid distribution means in pressure fluid motors of the reciprocating piston type.

In a pressure fluid motor of the reciprocating piston type, the flow of pressure fluid to the motor cylinder is usually controlled by a fluid actuated valve mechanism, and, in certain motors of modern design, cooperating relatively movable fluid distributing valves are employed to control the distribution of pressure fluid. In such a valve mechanism, the fluid supply chamber is ofttimes located within annular valve elements, and the pressure fluid has heretofore been supplied internally axially of the motor from one end of the motor cylinder to the supply chamber resulting in a relatively complicated supply arrangement which extends through jointed parts of the motor. It is accordingly desirable to supply pressure fluid to the internal supply chamber within the valve mechanism from the exterior of the valve mechanism directly therethrough, thereby simplifying the passage arrangement and eliminating passages through jointed motor parts. In a valve mechanism embodying cooperating relatively movable distributing valves, the supply passages must extend through or between the cooperating valves, and the fluid supply to the supply chamber must be continuously open irrespective of the positions of the cooperating valves.

It is accordingly an object of the present invention to provide an improved fluid supply passage arrangement for the distributing valve mechanism of a pressure fluid motor whereby the desirable features specified above are attained. Another object is to provide an improved fluid supply passage arrangement for conducting pressure fluid to the internal fluid supply chamber within the valve mechanism whereby fluid flow to both ends of the cylinder is substantially improved. A still further object is to provide an improved fluid distributing valve mechanism embodying cooperating, relatively movable fluid distributing valves having an internal fluid supply chamber which the valves surround and improved supply passage means for conducting pressure fluid through or between the valves to the supply chamber. A still further object is to provide an improved fluid distributing valve mechanism having an internal fluid supply chamber from which fluid is supplied to the opposite ends of the motor cylinder and having improved passage means for conducting pressure fluid from the exterior of the valve mechanism in transverse planes past the latter to the internal supply chamber, thereby to simplify the supply passage arrangement. Other objects and advantages of the invention will, however, hereinafter more fully appear as the description proceeds.

In the accompanying drawings there are shown for purposes of illustration one form and two modifications thereof which the invention may assume in practice.

In these drawings:

Fig. 4 is an enlarged fragmentary sectional view taken on the plane of Fig. 1, illustrating details of the valve mechanism and the associated supply passage arrangement.

Fig. 5 is a cross-sectional view taken substantially on line 5—5 of Fig. 1.

Fig. 6 is a side elevational view of the rear distributing valve.

Fig. 7 is a side elevational view of the front distributing valve.

Fig. 8 is a fragmentary sectional view taken on the plane of Fig. 1, showing a modified construction.

Fig. 9 is a cross-sectional view taken substantially on line 9—9 of Fig. 8.

Figs. 10 and 11 are side elevational views of the front and rear valves respectively of Fig. 8.

Fig. 12 is a sectional view similar to Fig. 8, showing another modified construction.

Fig. 13 is a side elevational view of the central valve sleeve.

Fig. 14 is a cross-sectional view taken on line 14—14 of Fig. 13.

Figure 1:
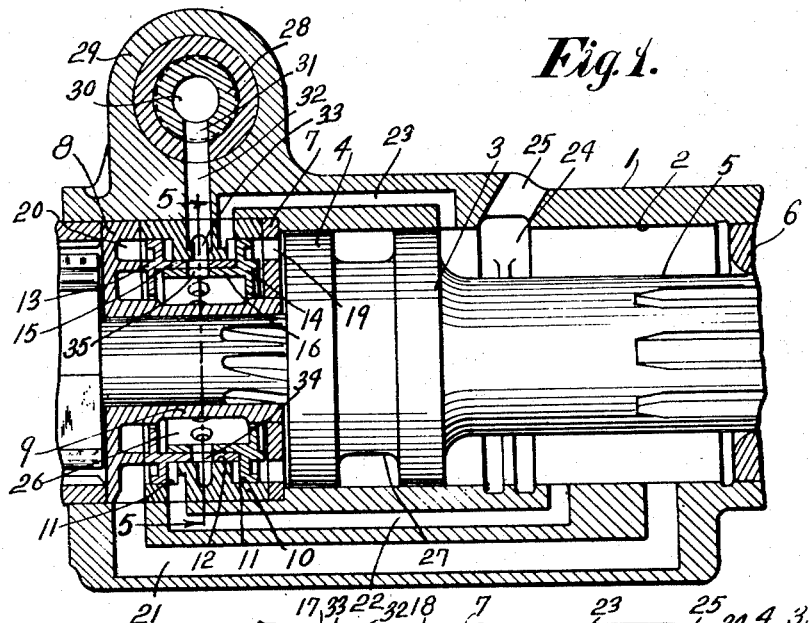
Fig. 1 is a view in central longitudinal section through a pressure fluid motor constructed in accordance with an illustrative embodiment of the invention.
Figure 2:
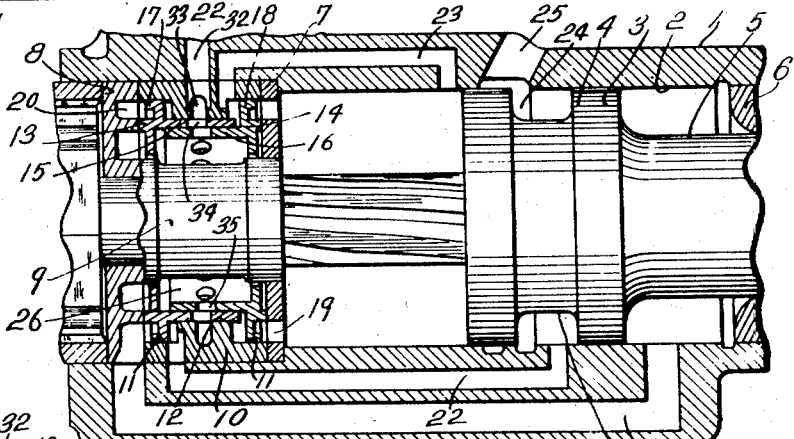
Fig. 2 is a sectional view similar to Fig. 1 with a portion broken away, showing parts in a different position.
Figure 3:
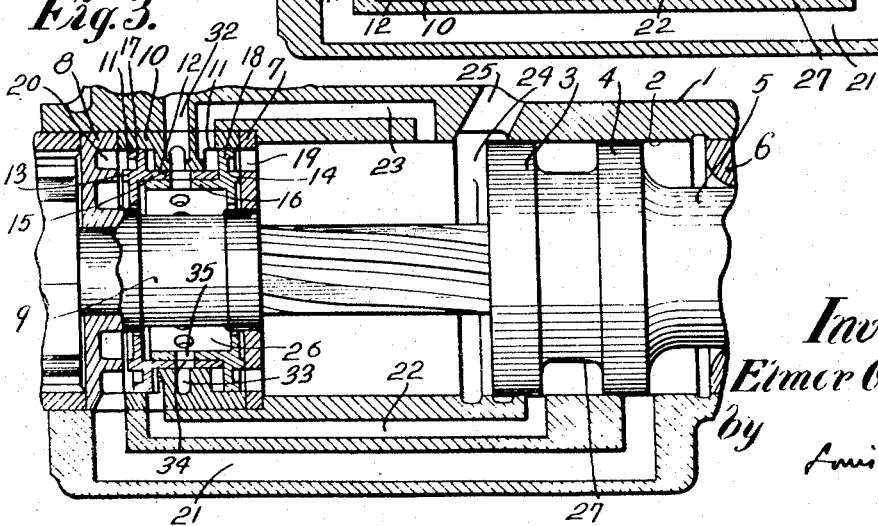
Fig. 3 is a sectional view similar to Fig. 2, showing parts in a still different position.

In the illustrative embodiment of the invention shown in Figs. 1 to 7 inclusive, the improved fluid distributing valve mechanism and associated fluid supply passage arrangement is embodied in a pressure fluid motor of the reciprocating piston type such as is employed in hammer rock drills or similar pneumatic tools. Evidently the invention may be incorporated in pressure fluid motors of other kinds.

The pressure fluid motor may be of the same general character as that disclosed in the J. C. Curtis patent, No. 2,224,861, patented December 17, 1940, and includes a motor cylinder 1 having a bore 2 containing a reciprocating motor piston 3. The piston has a head 4 slidingly fitting the cylinder bore and a reduced forward extension 5 which passes through a bore in a front motor head 6. The cylinder bore is closed at its rear end by a rear head plate 7. A plate 8 is spaced rearwardly of the cylinder from the rear head plate 7 and has a forwardly extending axial sleevelike portion 9 which at its front end is fitted in a central bore in the rear head plate. Surrounding the cylindric portion 9 between the plates 7 and 8 is a valve box 10 having enlarged end bores 11, 11, and a reduced central bore 12 extending between the end bores. Provided by the bores 11, 11 and 12 is a valve chamber containing a pair of cooperating, relatively movable fluid distributing valves 13 and 14 which preferably have sleevelike bodies 15 and 16 arranged in sliding telescopic relation. The valve bodies have external annular flanges 17 and 18 respectively slidingly fitting the end bores 11, and the exterior periphery of the outer valve body 15 slidingly fits the intermediate bore 12. Supply passages 19 in the head plate 7 directly connect the front end of the front bore 11 to the rear end of the cylinder bore. Communicating with the rear end of the rear bore 11 is an annular recess 20 in the front face of the rear plate 8, and a motor passage 21 connects this recess with the front end of the bore of the motor cylinder. Piston controlled valve throwing passages 22 and 23 communicate with the cylinder bore at longitudinally spaced points at the opposite sides of a cylinder exhaust groove 24, the latter being connected to atmosphere through an exhaust opening 25. The throwing passages respectively communicate with the inner ends of the bores 11, 11 at the inner sides of the valve flanges 17 and 18 respectively. Formed within the valve chamber internally of the valve is an annular fluid supply chamber 26 surrounding the extension 9 of the rear plate 8, and the valves control the communication of the motor passages 19 and 21 with this supply chamber. The piston head 4 is externally annularly grooved at 27 for connecting the throwing passages 22 and 23 alternately to the exhaust groove during reciprocation of the piston, as later explained.

The improved fluid supply passage arrangement associated with the valve mechanism for conducting pressure fluid to the internal supply chamber 26 comprises a rotary throttle valve 28 (Fig. 1) arranged in a bushing secured in a transverse bore in a lateral boss 29 projecting from one side of the motor cylinder. The throttle valve has an internal bore 30 to which pressure fluid may be conducted from any suitable external source of fluid supply. A port 31 traversing the valve walls is communicable with a straight right angle passage 32 disposed in transverse planes perpendicular to the valve axes, leading directly to a groove 33 formed in the inner wall of the valve box 10 centrally between the end bores 11, 11. The sleevelike bodies 15 and 16 of the valves are traversed by series of ports 34 and 35 which in all positions of the valves connect the groove 33 with the internal supply chamber 26.

In the modification shown in Figs. 8 to 11 inclusive, the valve mechanism and the associated fluid supply passage arrangement are essentially the same as those of the form above described with the exception that the distributing valves are somewhat modified. In this construction arranged in the valve chamber are cooperating, relatively movable fluid distributing valves 40 and 41 for controlling the flow of pressure fluid from the internal supply chamber 26 to the motor passages 19 and 21 leading to the opposite ends of the bore of the motor cylinder, the valves having external annular flanges 42 and 43 respectively slidingly fitting the bores 11 of the valve box. The valves are identical in design and have sleevelike bodies 44 and 45 arranged in end to end abutting relation, thereby differing from the telescopic body arrangement of the embodiment above described. The adjacent ends of the valve bodies are serrated or notched at 46 and 47 respectively to provide flow passages for constantly connecting the external groove 33 with the internal supply chamber 26. Otherwise this embodiment is similar to that above described.

In the modification shown in Figs. 12, 13 and 14 the distributing valve mechanism and fluid supply passage arrangement are similar to those above described with the exception that the valve structure is somewhat modified. In this construction the valve box 10' has stepped bores 48 and 49 intermediate the bores 11' and 12', and the bore 12' is of less length than the intermediate bore 12 of the other embodiments. Arranged in the valve chamber are cooperating, relatively movable fluid distributing valves 50 and 51 having external annular flanges 52 and 53 slidingly fitting the end bores 11', and sleevelike bodies 54 and 55 slidingly fitting the stepped intermediate bores 48 and 49 respectively. Telescopically arranged within the sleevelike valve bodies intermediate the valves and slidingly fitting the intermediate bore 12' is a sleeve 56. This sleeve has end abutting relation with the valves so that one valve may act on the other valve through the sleeve to hold the same in closed position. The walls of the sleeve are centrally perforated by series of ports 57 which continuously connect the external groove 33 with the internal supply chamber 26' within the valves. The valves control the flow of pressure fluid from the internal supply chamber to the motor passages 19 and 21 leading to the opposite ends of the bore of the motor cylinder. Vent passages 58 and 59 are provided to prevent entrapment of fluid in the bores 48 and 49 in a manner to interfere with valve movements. Otherwise this form of the invention is similar to those above described.

The general mode of operation of the improved pressure fluid motor is as follows: When the fluid distributing valves 13 and 14 and the motor piston 3 are in the position shown in Fig. 1 and the throttle valve 28 is opened, pressure fluid may flow from the internal bore 30 in the valve through port 31 and passage 32 to the groove 33 and thence through the series of ports 34 and 35 in the telescopically arranged valve bodies to the internal supply chamber 26. Pressure fluid may flow from the internal supply chamber past the front valve 14 through the front bore 11 past the front face of the then open front valve 14 and through passages 19 to the rear end of the cylinder bore. The pressure fluid flowing to the rear end of the cylinder bore acts on the rear pressure area of the piston head 4 to move the piston forwardly, and, as the piston moves forwardly, the piston-head-groove 27 connects the throwing passage 23 to the exhaust groove 24 and then closes the communication of the exhaust groove 24 and then closes the communication of the exhaust groove with the front end of the cylinder bore. Upon continued forward piston movement the following edge of the piston head uncovers the throwing passage 23 to admit pressure fluid from the rear end of the cylinder bore through the throwing passage to the bore 11 at the rear side of the valve flange 18 of the front valve. Due to the relatively free flow of fluid past the front face of the front valve, the pressure of the fluid acting on the rear pressure area of the valve flange is at this time substantially greater than the opposing pressure, and, as a result, the front valve 14 is thrown forwardly to its foremost closed position shown in Fig. 2. At this time both valves 13 and 14 are closed so that fluid flow to both cylinder ends is momentarily completely cut off and forward movement of the piston continues under the expansive action of the fluid in the rear end of the cylinder bore and momentum. Thereafter the following edge of the piston head uncovers the exhaust groove 24 connecting the rear end of the cylinder bore to exhaust. As the piston approaches the end of its forward travel, the fluid trapped in the front end of the cylinder bore is compressed by the piston building up the pressure in the recess 20 rearwardly of the rear valve 13 to throw the latter forwardly to its open position shown in Fig. 3. The rear valve, when opened, abuts the front valve 14 to hold the latter in its foremost closed position. Pressure fluid may then flow from the internal supply chamber 26 through the rear bore 11 past the rear face of the then open rear valve 13 and through motor passage 21 to the front end of the cylinder bore. The fluid flowing to the front end of the cylinder bore acts on the front pressure area of the piston head 4 to move the piston rearwardly. The rear valve 13 is at this time held in its forward position by the pressure fluid acting on the rear pressure area of the valve internally of the outer surface of the valve body. As the piston moves rearwardly from the position shown in Fig. 3, the piston head groove 27 first connects the throwing passage 22 to exhaust and thereafter the leading edge of the piston head overruns the exhaust groove, thereby cutting off communication of the rear end of the cylinder bore with the exhaust. Upon continued rearward piston movement, the piston head overruns the throwing passage 23 and thereafter the following edge of the piston head uncovers the throwing passage 22 admitting pressure fluid from the front end of the cylinder bore to the rear bore 11 at the forward side of the flange 17 of the rear valve 13. Due to the relatively free flow of fluid past the rear face of the rear valve, the pressure of the fluid acting on the front side of the valve flange 17 throws the rear valve rearwardly to its closed postion shown in Fig. 2. At this time the front valve is maintained closed by the pressure of the fluid acting on the rear pressure area of the valve internally of the outer surface of the valve body. When the valves are in the position shown in Fig. 2, they are both closed so that fluid flow to both ends of the cylinder is momentarily completely cut off and the piston continues to move rearwardly under the expansive action of the fluid in the front end of the cylinder bore and momentum. As the piston continues to move rearwardly, the following edge of the piston head uncovers the exhaust groove connecting the front end of the cylinder bore to exhaust. As the piston approaches the rear end of its travel, the fluid trapped in the rear end of the cylinder bore is compressed by the piston, and this increased pressure acts on the front pressure area of the flange 18 of the front valve 14 to throw the latter rearwardly to its open position shown in Fig. 1, wherein the front valve abuttingly engages the rear valve to maintain the latter closed. Resultantly, pressure fluid is again admitted to the rear end of the cylinder bore and the cycle of operations above described is repeated.

The modified valve constructions shown in Figs. 8 to 14, inclusive, operate in the same general manner as the form above described. In the modification shown in Figs. 8 to 11 inclusive, the pressure fluid from the throttle valve flows through port 31, passage 32, groove 33 and the notched spaces 46, 47 in the adjacent ends of the valves 40 and 41 to the internal fluid supply chamber, and thence under the control of the valves alternately to the motor passages 19 and 21 leading to the opposite ends of the cylinder bore. In this embodiment, the valves are identical and the inner ends of the alined valves directly abut one another in different positions. In the form shown in Figs. 12, 13 and 14, the valves 50 and 51 are likewise identical, but, in this instance, one valve acts on the other through the intermediate sleeve 56, and the fluid flows to the internal supply chamber 26' through the series of ports 57 in the intermediate sleeve. In other respects, these valve modifications are similar to the other embodiment, and accordingly further description of their modes of operation is herein unnecessary.

As a result of this invention, an improved pressure fluid motor is provided having an improved fluid distributing valve mechanism and an improved fluid supply passage arrangement associated therewith whereby the motor structure is simplified. It will further be evident that, by the provision of the improved fluid supply passage arrangement for supplying pressure fluid to the internal supply chamber within the valves, the passage arrangement is not only simplified, but passages extending through jointed motor ports are eliminated. It will also be evident that by supplying pressure fluid to the supply chamber within the valves directly through ports in or between the valves, it is possible to reduce the length of the passages between the throttle valve and the supply chamber, thereby not only simplifying the structure, but also improving the fluid flow to the motor passages. Other modes of use and advantages of the invention will be clearly apparent to those skilled in the art.

While there are in this application specifically described one form and two modifications which the invention may assume in practice, it will be understood that this form and these modifications of the same are shown for purposes of illustration, and that the invention may be further modified and embodied in various other forms without departing from its spirit or the scope of the appended claims.

What I claim as new and desire to secure by Letters Patent is:

1. In a pressure fluid motor, the combination comprising a cylinder, a piston reciprocable in said cylinder, and fluid distribution means for the motor including means providing a valve chamber, motor passages leading from the valve chamber to the opposite cylinder ends, a pressure fluid supply chamber, a fluid distributing valve mechanism movably mounted in said valve chamber for controlling the flow of pressure fluid from said supply to said motor passages, said valve mechanism surrounding said supply chamber and including a pair of cooperating relatively movable fluid distributing valves, each valve in one position thereof adapted to exert a force on the other valve to hold the latter closed, means for conducting pressure fluid from an external source through said valve mechanism to said fluid supply chamber, including ports in said valves through which fluid is conducted to said internal fluid supply chamber, and means controlled by the piston for controlling the movements of said distributing valves into their different operating positions without interrupting fluid flow through said valve ports to said internal fluid supply chamber.

2. In a pressure fluid motor, the combination comprising a cylinder, a piston reciprocable in said cylinder, and fluid distribution means for the motor including means providing a valve chamber, motor passages leading from the valve chamber to the opposite cylinder ends, a pressure fluid supply chamber, a fluid distributing valve mechanism movably mounted in said valve chamber for controlling the flow of pressure fluid from said supply chamber to said motor passages, said valve mechanism surrounding said supply chamber and including a pair of cooperating fluid distributing valves movable relative to one another and into abutting relation in certain positions of the valves, means for conducting pressure fluid from an external source through said valve mechanism to said fluid supply chamber including ports in said valves through which fluid is conducted to said internal fluid supply chamber, and means controlled by the piston for controlling the movements of said distributing valves into their different operating positions without interrupting fluid flow through said valve ports to said internal fluid supply chamber.

3. In a pressure fluid motor, the combination comprising a cylinder, a piston reciprocable in said cylinder, a fluid distribution means for the motor including means providing a valve chamber, motor passages leading from the opposite ends of said valve chamber to the opposite cylinder ends, a pair of cooperating, relatively movable distributing valves in said valve chamber, a fluid supply chamber arranged within said valves, said valves controlling the flow of pressure fluid from said internal supply chamber to said motor passages and each valve in one position thereof adapted to exert a force on the other valve to hold the latter closed, means for conducting pressure fluid from an external source in transverse planes through said valves to said internal supply chamber, and means controlled by the piston for controlling the movements of said valves into their different operating positions without interrupting fluid flow from said conducting means to said internal supply chamber.

4. In a pressure fluid motor, the combination comprising a cylinder, a piston reciprocable in said cylinder, a fluid distribution means for the motor including means providing a valve chamber, motor passages leading from the opposite ends of said valve chamber to the opposite cylinder ends, a pair of cooperating, relatively movable distributing valves in said valve chamber, a fluid supply chamber arranged within said valves, said valves controlling the flow of pressure fluid from said internal supply chamber to said motor passages, said valves having telescopically arranged sleevelike bodies traversed by ports, means for conducting pressure fluid from an external source in transverse planes through the ports in said valves to said internal supply chamber, and means controlled by the piston for controlling the movements of said valves into their different operating positions without interrupting fluid flow from said conducting means through said valve ports to said internal supply chamber.

5. In a pressure fluid motor, the combination comprising a cylinder, a piston reciprocable in said cylinder, a fluid distribution means for the motor including means providing a valve chamber, motor passages leading from the opposite ends of said valve chamber to the opposite cylinder ends, a pair of cooperating, relatively movable distributing valves arranged for movement into end abutting relation in said valve chamber and having notched inner ends, a fluid supply chamber arranged within said valves, said valves controlling the flow of pressure fluid from said internal supply chamber to said motor passages, means for conducting pressure fluid from an external source through the notches in said valves to said internal supply chamber, and means controlled by the piston for controlling the movements of said valves into their different operating positions without interrupting fluid flow through said valve-notches to said internal supply chamber.

6. In a pressure fluid motor, the combination comprising a cylinder, a piston reciprocable in said cylinder, a fluid distribution means for the motor including means providing a valve chamber, motor passages leading from the opposite ends of said valve chamber to the opposite cylinder ends, a pair of cooperating, relatively movable distributing valves and an intermediate sleeve in said valve chamber, said valves being movable relative to said sleeve and either valve being adapted to act on the other valve through said sleeve, said sleeve being traversed by a series of ports, a fluid supply chamber arranged within said sleeve and valves, said valves controlling the flow of pressure fluid from said internal supply chamber to said motor passages, means for conducting pressure fluid from an external source through the ports in said sleeve to said internal supply chamber, and means controlled by the piston for controlling the movements of said valves and sleeve into their different operating positions without interrupting fluid flow through said sleeve-ports to said internal supply chamber.

7. In combination, in a motor, a cylinder, a piston reciprocable in said cylinder, and fluid supply and distribution means for said motor including a valve chest, passages leading from said valve chest to the opposite ends of said cylinder, valve elements arranged within said valve chest and having mutually overlapping wall portions and movable relative to each other and to said valve chest and having means cooperating with said valve chest in one position of said valve elements to provide internally of the valve elements a chamber sealed from communication with said cylinder through said passages, and means for delivering motive fluid to said internal chamber for distribution therefrom under the control of said valve elements through said passages to the opposite ends of said motor cylinder including a fluid supply conduit opening into said valve chest through a circumferential wall of the latter at a point intermediate the ends of said valve chest and ports in the overlapping wall portions of said valve elements maintaining continuous communication between said conduit and said internal chamber in all positions of said valve elements.

8. In combination, in a motor, a cylinder, a piston reciprocable in said cylinder, and fluid supply and distribution means for said motor including a valve chest, passages leading from said valve chest to the opposite ends of said cylinder, valve elements arranged within said valve chest and movable relative to each other and to said valve chest and having portions adapted to abut with each other in certain valve element positions and having means cooperating with said valve chest in one position of said valve elements to provide internally of the valve elements a fluid supply chamber sealed from communication with said cylinder through said passages, and means for delivering motive fluid to said internal chamber for distribution therefrom under the control of said valve elements through said passages to the opposite ends of said motor cylinder including a fluid supply conduit opening into said valve chest through a circumferential wall of the latter at a point intermediate the ends of said valve chest and fluid flow providing means including passage means traversing the side walls of said intermittently abutting portions of said valve elements maintaining continuous communication between said conduit and said internal chamber in all positions of said valve elements.

9. In combination, in a motor, a cylinder, a piston reciprocable in said cylinder, and fluid supply and distribution means for said motor including a valve chest, passages leading from said valve chest to the opposite ends of said cylinder, valve elements and an intermediate sleeve with which said valve elements overlap arranged within said valve chest and movable relative to each other and to said valve chest and cooperating with each other and with said valve chest in one position of said valve elements and said sleeve to provide internally of said valve elements and sleeve a chamber sealed from communication with said cylinder through said passages, and means for delivering motive fluid to said internal chamber for distribution therefrom under the control of said valve elements through said passages to the opposite ends of said motor cylinder including a fluid supply conduit opening into said valve chest through a circumferential wall of the latter at a point intermediate the ends of said valve chest and fluid flow providing means formed in said sleeve for maintaining continuous communication between said conduit and said internal chamber in all positions of said valve elements and said sleeve.

10. In a pressure fluid motor, the combination comprising a cylinder, a piston reciprocable in said cylinder, and fluid distribution means for the motor including means providing a valve chamber, motor passages leading from said valve chamber to the opposite ends of said cylinder, a pressure fluid supply chamber, a fluid distributing valve mechanism movably mounted in said valve chamber and including a distributing valve element reciprocably guided in said valve chamber and surrounding said supply chamber, said valve mechanism controlling the flow of pressure fluid from said internal supply chamber to said motor passages, said valve mechanism in a certain position thereof cutting off concurrently communication of said motor passages with said supply chamber, means for conducting pressure fluid from an external source in transverse planes through the side wall of said valve element substantially midway between the remote ends of said valve mechanism to said internal supply chamber, and means controlled by said piston for controlling the movements of said valve mechanism into different operating positions while continuously maintaining fluid flow through said conducting means past said valve element to said internal supply chamber.

ELMER G. GARTIN.

REFERENCES CITED

The following references are of record in the file of this patent:

UNITED STATES PATENTS

| Number | Name | Date |
| --- | --- | --- |
| 1,777,335 | Smith | Oct. 7, 1930 |
| 1,929,420 | Gartin | Oct. 10, 1933 |
| 2,093,088 | Mack | Sept. 14, 1937 |
| 2,169,887 | Smith | Aug. 15, 1939 |
| 2,224,861 | Curtis | Dec. 17, 1940 |
| 2,224,862 | Sinclair | Dec. 17, 1940 |
| 2,252,711 | Gartin | Aug. 19, 1941 |
| 2,260,300 | Curtis | Oct. 28, 1941 |
| 2,307,847 | Morrison | Jan. 12, 1943 |
| 2,369,714 | Carr | Feb. 20, 1945 |